Oct. 25, 1966 G. W. LEHMANN 3,280,776
SALVAGE GEAR
Filed July 13, 1964
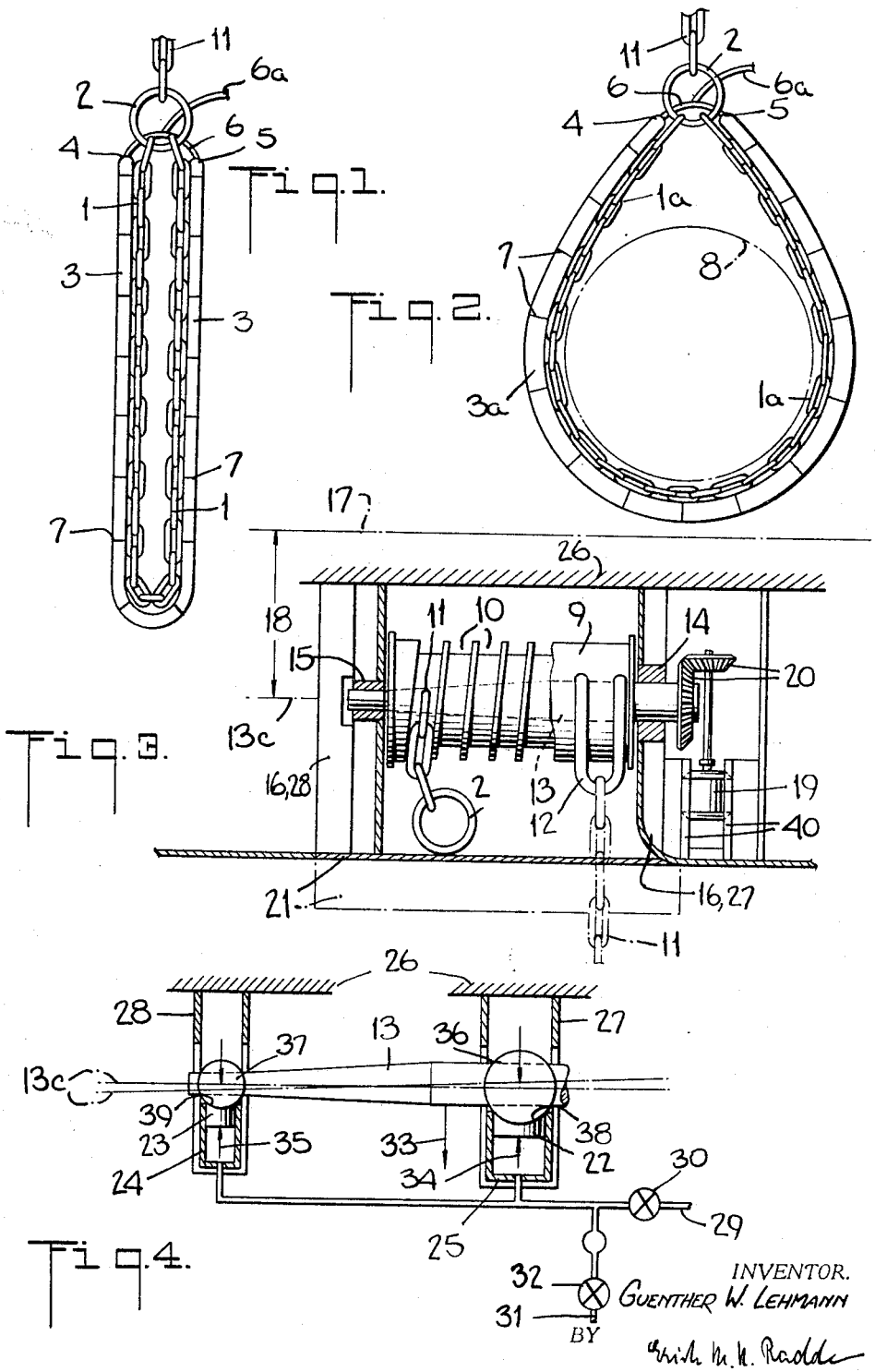
INVENTOR.
GUENTHER W. LEHMANN
BY
Erich M. H. Radde
AGENT United States Patent Office 3,280,776
Patented Oct. 25, 1966

3,280,776
SALVAGE GEAR
Guenther Wolfgang Lehmann, 425 Bernardo Ave.,
Sunnyvale, Calif.
Filed July 13, 1964, Ser. No. 382,254
10 Claims. (Cl. 114—51)

When salvaging sunken objects, e.g. submarines, from deep water, it has been proposed to use two large submergence cylinders which are connected to each other by strongbeams resembling a catamaran ship structure. A chain or rope attached with its ends to each of the cylinders provides a sling of sufficient opening for slipping it over the stern or bow of a sunken object or submarine whereupon the object is raised by draining the ballast tanks of the cylinders.

A catamaran-type salvage vessel or two pontoons are required to provide two supporting points for a chain in order to establish a certain opening of the salvage chain. If a salvage lifting rope or chain is supported at only one point, the two parts of the chain are hanging down close to each other without providing a sliding in the customary sense.

The method of using a catamaran-type salvage means is basically the same as hitherto employed in salvage work from the surface where two pontoons raise a sunken object by a two-way rope pull.

It is one object of the present invention to provide a sling which requires only one supporting salvage body instead of two bodies such as a catamaran-type salvage vessel.

Another object of the present invention is related to proper stowage of the sling and extension ropes or chains within the boundaries of the salvage vessel. It should be borne in mind that a salvage vessel has to proceed to the site of operation with a speed as high as possible. This refers particulary to salvaging sunken submarines where not only the submarine itself has to be salvaged but also the personnel to be rescued which requires immediate action.

A salvage vessel, therefore, should have a smooth surface for attaining high speeds. Any additional resistance by appendages such as salvage ropes and chains, which extend beyond the hull and cause considerable drag, is prohibitive. For this reason, proper stowage of salvage chains inside the hull is mandatory.

Apart from the view point of ship resistance in connection with salvage chains the present invention tried to solve at the same time (a) proper attachment of the slings and chains to a salvage vessel particularly with reference to redundant forces; (b) easy preparation for salvage mission in a drydock or floating dock; (c) easy release of slings and salvage chains at the site of salvage operation.

With these objectives in mind, it is proposed to provide a salvage sling, consisting preferably of specially forged aluminum chain links attached to an inflatable and expandible bag by straps along the outside of the chain.

When the salvage chain is dropped at the salvage site, it does not develop a sling. To provide a sling, the bag is filled with pressurized gas or air. While the bag expands with a tendency to assume a circular shape like a pressurized tire, the chain follows and a chain sling is established which can be slipped over the end-structure of a submarine or other salvage object by using only one supporting salvage vehicle.

A heavy chain attached to a pressure bag as described will expand at open air to a sling only under considerable pressure of the gas within the bag system. However, a heavy chain expands under water to a sling more readily due to the fact that, while the bag expands under water, buoyancy forces develop which are supporting the weight of the chain so that in a certain sense the heavy chain becomes lighter when submerged.

Regarding stowage of the sling and extension ropes or chains, it is proposed to wind the extension chain, hereinafter called first chain, on a drum rather than to use a customary chain locker.

The first chain does not need to be as long as an anchor chain. Therefore, only a small drum is required with grooves matching the chain links. The drum is attached to a heavy shaft supported by bearings which are attached to the structure of the salvage vessel. When the first chain is reeled on the drum, the end of the chain carrying the chain sling, is hanging down from the drum with the chain sling properly stowed below the drum. The other end of the first chain is attached to a heavy padeye at the opposite side of the drum.

The first chain is lowered by rotating the drum until all grooves are empty, and until the first chain hangs down from the padeye of the drum. The chain sling attached to the first chain is ready for expansion by filling the bags as described above.

The shell of the drum is not designed to transfer heavy salvage forces. The branches of the padeye which support the first chain are carried forth to the inside of the drum and are attached to the centershaft. In this way a heavy salvage force is transferred from the chain sling, the first chain, the padeye, and over the heavy shaft finally to the structure of the salvage vessel.

For reason of static stability the centerline of the shaft should be well below the center of buoyancy, i.e. the stowage system as described should be arranged in the lower portion of the salvage vessel structure, but still inside the hull.

It is frequently required to employ a number of ropes or chains for salvaging a sunken object. Such supporting system establishes a statically indeterminated force system. A salvage operation can be jeopardized if certain ropes or chains take a greater share on the overall salvage force than others up to a point where some salvage ropes or chains are stressed beyond their capabilities. It is almost impossible to control such statically indeterminated force system without special means.

In order to control the forces of the ropes or chains individually it is proposed to support the bearings of the shaft of the salvage winch by hydraulically controlled pistons. Each winch can thus be controlled individually in regard to the salvage forces or, by a common pressure line, all winches can be controlled in unison when it is desired to produce equal salvage forces throughout.

Upon completion of the salvage work, a winch motor rotates the drum and reels the chain onto the drum in proper stowage position.

The advantages and other features of the invention become more apparent while the description of a preferred embodiment proceeds in conjunction with the drawing, wherein FIG. 1 shows a chain sling with bags attached thereto, the latter in unexpanded condition;

FIG. 2 shows a chain sling with bags attached thereto in expanded condition, the chain forming a sling with an ample opening;

FIG. 3 is an elevation of the drum stowage system for a salvage chain and chain sling;

FIG. 4 is a schematic elevation of the hydraulic supports of the shaft of the chain drum of FIG. 3.

Referring now to the drawing and particularly to FIG. 1, there is a chain sling 1, a supporting ring 2, and an expandible bag 3. The ends 4 and 5 of the bag 3 are connected by a flexible pipe 6, to which a pressure hose 6a is attached. The bag 3 and the chain sling 1 are connected to each other by straps 7, preferably at every second chain link.

Upon lowering the system into the water, the bag 3 is filled with pressurized gas or air whereupon the bag 3 expands to an almost circular shape 3a and causes the chain sling 1 to assume a shape in the fashion of a regular sling, as best illustrated by the number 1a in FIG. 2.

The opening of the expanded chain sling 1a is then ample enough to slip the chain sling 1a over the end structure of a sunken submarine 8, by example.

A drum 9 has grooves 10 which match the links of the first chain 11. In stowage position the chain sling 1 is stowed in the space below the drum 9 as shown in FIG. 3.

The end of the first chain 11 is attached to a heavy padeye 12, which, in turn, is connected to a heavy shaft 13 which carries the drum 9.

The shaft 13 is supported by bearings 14, 15, which are attached to the surrounding structure 16 of the salvage vessel. The centerline 13c of the shaft 13 should be well below the level of the center of buoyancy 17, as indicated by arrow 18.

A motor 19 turns the drum 9 over a gear 20. In salvage operating position flaps 21 of the salvage vessel are open, which the drum 9 is rotated, unreeling hereby the first chain 11 up to a point where the padeye 12 reaches its lowermost position, as best illustrated in FIG. 3.

Bearings 14, 15 of the shaft 13 may also be supported by hydraulic pistons 22, 23, as shown in FIG. 4. The pistons 22, 23 are housed in cylinders 24, 25, which are attached to the structure 26 of the salvage vessel by special supporting cylinders or equivalent structures 27, 28. A pressure line 29 with a valve 30 controls the pressure of the pistons 22, 23 individually for each winch. A pressure line 31 with a valve 32 interconnects a group of salvage winches, if it is desired to apply the same pressure to all salvage winch pistons.

Since the salvage force 33 is acting near the end of the shaft 13, the reaction forces at the bearings 34, 35 are of different magnitude. The diameters of the hydraulic cylinders 24, 25 are accordingly also different in order to produce reaction forces of appropriate magnitude at the same hydraulic pressure on both pistons.

In the event that the shaft 13, hydraulically supported, develops a slight incline against the system axis, it is suggested for proper self-adjustment of the shaft 13 to build the supporting ends of the shaft 13 in form of spheres 36, 37 with matching half-spherical grooves 38, 39 atop of the pistons 22, 23. The motor 19 has allowance to follow vertical displacements of the shaft 13 by guidance means 40 attached to the salvage structure 26 of the salvage vessel.

While the present invention has been described in connection with certain now preferred embodiments, it will be clearly understood that many variations and modifications may occur to those skilled in the art, particularly after benefitting from the present teaching without departing from the spirit and scope of this invention as defined in the appended claims.

I claim.

1. A salvage gear comprising a first salvage lifting means, a lifting sling attached to said first salvage lifting means, and an inflatable bag attached to and alongside said lifting sling, said lifting sling forming, on inflating the bag attached thereto, a sling of sufficient diameter to be slipped over the object to be salvaged.

2. A salvage gear comprising a first salvage lifting means, a lifting sling attached to said first salvage lifting means, and an inflatable bag attached to and alongside said lifting sling, a hose connecting the ends of said inflatatable bag, and a pressure hose line connected to said interconnecting hose, said lifting sling forming, on inflating the bag attached thereto, a sling of sufficient diameter to be slipped over the object to be salvaged.

3. A salvage gear comprising a first salvage lifting means, a lifting sling attached to said first salvage lifting means, an inflatable bag attached to and alongside said lifting sling, said lifting sling forming, on inflating the bag attached thereto, a sling of sufficient diameter to be slipped over the object to be salvaged, a winch with a drum for storage of said first salvage lifting means, means for supporting said first salvage lifting means, said means extending to the shaft of the winch and fixedly attached thereto, said winch shaft being tapered in axial direction from the side of said supporting means to the opposite end of the shaft, means for rotating said winch, and a large bearing and a small bearing at the ends of the shaft in accordance with the respective bearing loads.

4. The salvage gear according to claim 3, wherein the centerline of the winch shaft is located below the level of buoyancy center of the salvage vessel to which the salvage gear is attached with the winch being within the boundaries of the hull of the salvage vessel.

5. The salvage gear according to claim 4, wherein said winch is accommodated within the boundaries of the hull of the salvage vessel so as to leave sufficient stowage space below the winch and the bottom of the salvage vessel for proper storage of said lifting sling and wherein the bottom of the stowage area consists of turnable flaps forming part of the hull of the salvage vessel.

6. The salvage gear according to claim 3, wherein the shaft bearings are supported by hydraulically operated pistons of different diameters in accordance with the relative load on each bearing.

7. The salvage gear according to claim 6, wherein the pistons are housed in hydraulic cylinders being supported by supporting structures attached to the hull structure of the salvage vessel.

8. The salvage gear according to claim 6, wherein the shaft ends are spherical members and wherein the supporting pistons are provided at their top with recesses to match and accommodate said spherical members.

9. The salvage gear according to claim 3, wherein the means for rotating the winch is a gear and a motor, said motor rotating the winch drum and being guided by structural members attached to the hull structure of the salvage vessel, said structural members allowing vertical displacements of said motor in accordance with vertical displacements of the winch shaft.

10. The salvage gear of claim 7, wherein the hydraulic cylinders for the supporting pistons of the winch are connected to an individual pressure line provided with a control valve.

References Cited by the Examiner
UNITED STATES PATENTS

| | | | |
|---|---|---|---|
| 710,869 | 10/1902 | Johnson et al. | 114—51 |
| 1,278,215 | 9/1918 | Rawlins | 114—51 |

FOREIGN PATENTS

| | | |
|---|---|---|
| 8,567 | 9/1896 | Sweden. |

MILTON BUCHLER, *Primary Examiner.*

T. M. BLIX, *Assistant Examiner.*